Patented Mar. 11, 1930

1,749,833

UNITED STATES PATENT OFFICE

ADOLF MÜLLER, OF MUNICH, GERMANY, ASSIGNOR TO SIGISMUND NEUMAN, OF ZURICH, SWITZERLAND

PROCESS OF PRODUCING GUM FROM LOCUST BEANS

No Drawing. Application filed November 28, 1928, Serial No. 322,592, and in Germany October 8, 1928.

In the manufacture of gum from locust-beans the later are as is well known treated either mechanically or chemically with alkalies and acids in order to remove the skin and embryos from the albumen which is then lixiviated with water under pressure so as to yield the gum. The process is facilitated if the albumen is ground to a powder before the lixiviation. As the powder swells in the water, it is necessary, in order to prevent its agglomeration into lumps, to sprinkle it carefully through a hair sieve on to the water surface and keep the water in continual motion. Thus the process entails considerable difficulties.

The object of the present invention is to facilitate the gum production and to improve the quality of the article, and the invention consists in adding alkylized naphthalene sulphacid ($C_{10}H_6SO_3HCH_3$) in liquid or solid form, either to the ground or unground albumen or to the water in which it is lixiviated.

By the addition of this substance, the disintegration of the albumen will be readily and completely effected, and the precautions usually necessary in mixing the powder with the water will be obviated. Moreover, the gum solution will, by the improved process, acquire qualities which are industrially of great value. For instance, while the pure gum solution is very brittle, the addition of the naphthalene will render it very tough. The adhesiveness of the gum, and consequently its scope of utility, will also be greatly increased.

Naphthalene sulphacid is, as is well known, a strong preservative, and the addition to the gum of other preservatives such as formaldehyde or the like will therefore be obviated.

If alkalies, or borax, are added to an ordinary gum solution of locust-beans, the character of the solution changes, the viscosity being increased and a jelly-like substance being obtained. For some purposes, for instance when the gum is used as a thickening medium in certain printing processes, it is essential that the gum should remain unaffected by alkalies, and this particular object is also achieved by the addition to the gum of alkylized naphthalene sulphacid.

The following is an example of the improved process:

100 kgs. ground locust-beans, freed from skin and embryos, are thoroughly mixed with 5–15 kgs. ground alkylized naphthalene sulphacid, and the mixed powders are dissolved in water. The solution will be completed in a few minutes after which boiling takes place either by the direct or indirect application of steam.

I claim:

1. A process of manufacturing gum from locust-beans consisting in mixing the albumen of the beans with alkylized naphthalene sulphacid, and dissolving the mixture in water.

2. A process of manufacturing gum from locust-beans consisting in grinding the albumen of the beans, mixing it with ground alkylized naphthalene sulphacid, dissolving the powder mixture in cold water, and boiling the solution with steam.

ADOLF MÜLLER.